(12) United States Patent
Kinoshita

(10) Patent No.: US 7,673,434 B2
(45) Date of Patent: Mar. 9, 2010

(54) FILLING MACHINE AND FILLING MONITORING METHOD

(75) Inventor: Shigehiro Kinoshita, Tokyo (JP)

(73) Assignee: Tetra Laval Holdings & Finance S.A. (CH)

( * ) Notice: Subject to any disclaimer, the term of this patent is extended or adjusted under 35 U.S.C. 154(b) by 0 days.

(21) Appl. No.: 11/791,636

(22) PCT Filed: Dec. 7, 2005

(86) PCT No.: PCT/JP2005/022469

§ 371 (c)(1),
(2), (4) Date: May 25, 2007

(87) PCT Pub. No.: WO2006/064702

PCT Pub. Date: Jun. 22, 2006

(65) Prior Publication Data

US 2008/0092491 A1    Apr. 24, 2008

(30) Foreign Application Priority Data

Dec. 17, 2004    (JP) .............................. 2004-366750

(51) Int. Cl.
*B65B 57/02* (2006.01)
(52) U.S. Cl. ............................... 53/64; 53/545; 53/550; 53/52
(58) Field of Classification Search .................... 53/64, 53/550, 545, 505, 51, 52
See application file for complete search history.

(56) References Cited

U.S. PATENT DOCUMENTS

| | | | | |
|---|---|---|---|---|
| 4,914,893 A | * | 4/1990 | Strub et al. ..................... | 53/567 |
| 5,557,510 A | * | 9/1996 | McIntyre et al. ............... | 700/17 |
| 5,802,804 A | * | 9/1998 | Esposti et al. .................. | 53/55 |
| 5,809,873 A | * | 9/1998 | Chak et al. ..................... | 100/4 |
| 6,513,396 B2 | * | 2/2003 | Nakamura et al. ..... | 73/862.335 |
| 6,769,226 B2 | * | 8/2004 | Holland et al. ................ | 53/411 |
| 6,925,893 B2 | * | 8/2005 | Abe et al. .............. | 73/862.332 |
| 7,310,926 B2 | * | 12/2007 | Nikoley et al. ................ | 53/574 |
| 7,360,344 B2 | * | 4/2008 | White et al. ................... | 53/399 |
| 2006/0000188 A1 | * | 1/2006 | Nikoley et al. ................. | 53/64 |
| 2006/0059864 A1 | * | 3/2006 | White et al. ................... | 53/399 |

FOREIGN PATENT DOCUMENTS

| JP | 53-110370 | 9/1978 |
|---|---|---|
| JP | 63-197806 | 12/1988 |

(Continued)

*Primary Examiner*—Christopher Harmon
(74) *Attorney, Agent, or Firm*—Bacon & Thomas, PLLC

(57) ABSTRACT

A filling machine and a filling monitoring method monitor the condition of a pressure roller and do not harm the quality of fluid food. The filling machine includes a first rotary member inside of the joining surface of a longitudinally sealed portion of a packaging material being fed; a second rotary member disposed in opposition to the first rotary member with the packaging material pinched therebetween; a rotation detection signal generator for generating a rotation detection signal in association with rotation of at least one of the first and second rotary members; and a monitoring processor for reading the rotation detection signal and detecting abnormality of rotation of at least one of the first and second rotary members. Damage to the inner surfaces of the packaging material or to the strip tape, and dropping of a sticking resin piece into fluid food contained in the packaging material are prevented.

8 Claims, 4 Drawing Sheets

FOREIGN PATENT DOCUMENTS

| | | |
|---|---|---|
| JP | 04-352605 | 12/1992 |
| JP | 10-007110 | 1/1998 |
| JP | 11-139415 | 5/1999 |
| JP | 2001-18909 | 1/2001 |
| JP | 2002-017815 | 1/2002 |

* cited by examiner

FILLING MACHINE AND FILLING MONITORING METHOD

TECHNICAL FIELD

The present invention relates to a filling machine and a filling monitoring method.

BACKGROUND ART

Conventionally, in production of packaging containers which contain food; for example, food having fluidity such as tea, juice, soup, or alcohol; i.e., fluid food, a web-like packaging material, a sheet-like packaging material, or the like is used, and the packaging material is formed into packaging containers by means of sealing at predetermined positions through heat sealing, ultrasonic sealing, or a like method. For example, in a filling machine, a web-like packaging material, when used, is formed into a tubular shape; while a strip tape is pressed against the tubular packaging material from inside, the tubular packaging material is sealed in the longitudinal direction by means of a longitudinal sealing device; while being filled with liquid food, the longitudinally sealed tubular packaging material is sealed and cut in the lateral direction at predetermined longitudinal intervals by means of a lateral sealing device, thereby yielding a pillow-like prototype container; and the prototype container is further formed into a predetermined shape, thereby completing a packaging container (refer to, for example, Patent Document 1).

In the conventional filling machine, at a position located downstream of the longitudinal sealing device with respect to the conveyance direction of the tubular packaging material, a pressure roller is rotatably disposed inside the tubular packaging material which has just been sealed in the longitudinal direction, and presses a longitudinally sealed region of the tubular packaging material; and a counter roller is rotatably disposed outside the tubular packaging material in opposition to the pressure roller and receives a pressing force applied by the pressure roller. Accordingly, as the packaging material travels, the pressure roller and the counter roller rotate while pinching therebetween the packaging material and the strip tape, thereby bringing the surface of an overlap of the longitudinally sealed region of the packaging material and the affixal surface of the strip tape into close contact with each other.

Patent Document 1: Japanese Patent Application Laid-Open (kokai) No. 2001-18909

DISCLOSURE OF THE INVENTION

Problems to be Solved by the Invention

However, in the conventional filling machine, since the longitudinal sealing device applies heat to the packaging material and the strip tape, a resin used to form the innermost layers of the packaging material and the strip tape; for example, polyethylene resin, may in some cases stick to the outer circumferential surface of the pressure roller. In this case, resistance is applied to the pressure roller and reduces the rotational speed of the pressure roller, thereby causing damage to the inner surfaces of the packaging material and the strip tape, or separation of a sticking resin piece and dropping of the resin piece into fluid food contained in the packaging material, potentially causing a deterioration in quality of the fluid food.

An object of the present invention is to solve the above-mentioned problems in the conventional filling machine and to provide a filling machine and a filling monitoring method which can monitor the condition of a pressure roller and do not cause a deterioration in quality of fluid food.

Means for Solving the Problems

To achieve the above object, a filling machine of the present invention comprises a first rotary member rotatably disposed at the inside of a joining surface of a longitudinally sealed portion of a packaging material being fed; a second rotary member rotatably disposed in opposition to the first rotary member with the packaging material pinched therebetween; a rotation detection signal generator for generating a rotation detection signal in association with rotation of at least one of the first and second rotary members; and monitoring processing means for reading the rotation detection signal and detecting abnormality of rotation of at least one of the first and second rotary members.

In another filling machine of the present invention, the first rotary member is a pressure roller having a permanent magnet. The second rotary member is a counter roller. The rotation detection signal generator generates a rotation detection signal in association with movement of the permanent magnet.

In a further filling machine of the present invention, the monitoring processing means uses, as a reference signal, a rotation detection signal generated when the pressure roller is rotated normally; then reads a rotation detection signal at predetermined timing and compares the read rotation detection signal with the reference signal; and detects abnormality of rotation of the pressure roller when the comparison shows that the pressure roller is not rotated normally.

A still another filling machine of the present invention further comprises report processing means for reporting occurrence of abnormality to an operator when abnormality of rotation of the pressure roller is detected.

A filling monitoring method of the present invention comprises feeding a packaging material; rotating, in association with feed of the packaging material, a first rotary member at the inside of a joining surface of a longitudinally sealed portion of the packaging material; rotating, in association with feed of the packaging material, a second rotary member disposed in opposition to the first rotary member with the packaging material pinched therebetween; and reading a rotation detection signal generated in association with rotation of at least one of the first and second rotary members, and detecting abnormality of rotation of at least one of the first and second rotary members.

EFFECTS OF THE INVENTION

According to the present invention, the filling machine comprises a first rotary member rotatably disposed at the inside of a joining surface of a longitudinally sealed portion of a packaging material being fed; a second rotary member rotatably disposed in opposition to the first rotary member with the packaging material pinched therebetween; a rotation detection signal generator for generating a rotation detection signal in association with rotation of at least one of the first and second rotary members; and monitoring processing means for reading the rotation detection signal and detecting abnormality of rotation of at least one of the first and second rotary members.

In this case, since abnormality of rotation of at least one of the first and second rotary members is detected on the basis of the rotation detection signal generated in association with rotation of at least one of the first and second rotary members, the following problem is prevented: damage to the inner surfaces of the packaging material and a strip tape, or separation of a sticking resin piece and dropping of the resin piece into fluid food contained in the packaging material, with a resultant deterioration in quality of the fluid food.

DESCRIPTION OF REFERENCE NUMERALS

Figure 1:
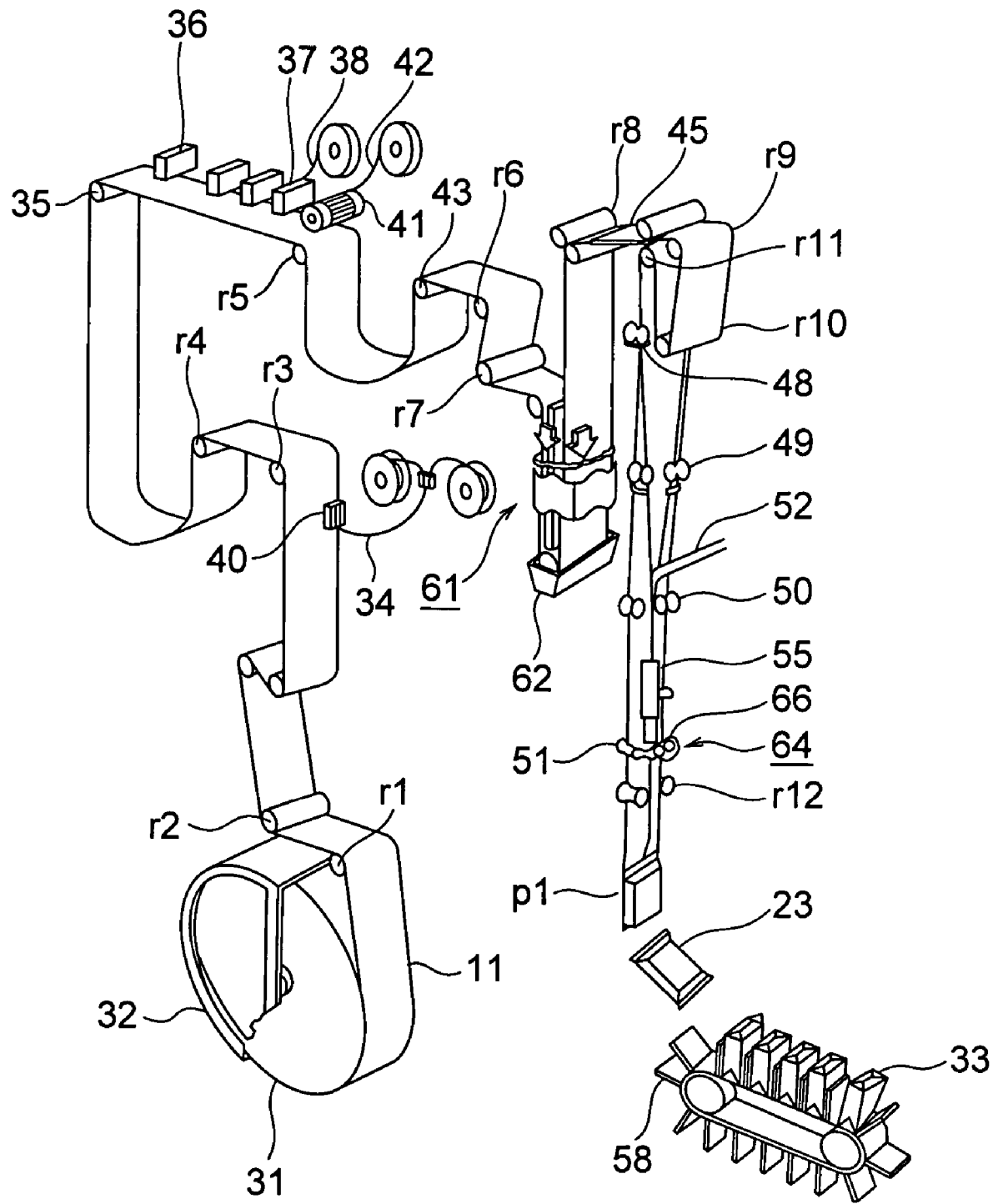
[FIG. 1] Conceptual view of a filling machine according to an embodiment of the present invention.

11: packaging material
65: pressure roller
66: counter roller
81: permanent magnet
82: magnetic sensor
83: control section

BEST MODE FOR CARRYING OUT THE INVENTION

An embodiment of the present invention will next be described in detail with reference to the drawings.

FIG. 1 is a conceptual view of a filling machine according to the embodiment of the present invention.

As shown in the drawing, a web-like packaging material 11 in the form of a reel 31 is accommodated in a cassette 32 and set in an unillustrated delivery section of the filling machine via the cassette 32. The packaging material 11 assumes the form of a flexible laminate configured as follows: a paper substrate is covered on both surfaces with a polyethylene resin film; as needed, a barrier layer, such as an aluminum foil or a gas-barrier resin, is formed between the paper substrate and each film; and facing is printed on a region of the packaging material 11 which corresponds to the facing surface of a packaging container 33.

The packaging material 11 delivered from the delivery section is intermittently fed by an unillustrated feeder, which serves as feeding means. The fed packaging material travels to a strip-tape-affixing device 40 via a bending roller r1, a damper roller r2, and the like. The strip-tape-affixing device 40 affixes a strip tape 34 to an edge portion of the packaging material 11. Subsequently, the packaging material 11 travels to a paper tensioner 35 via bending rollers r3 and r4 and then travels to a bending roller r5. In the course of the travel, a punch device 36 punches holes in the packaging material 11; an inner-tape-affixing device 37 affixes an inner tape 38 to the packaging material 11 so as to seal the punch holes from inside; and a pull-tab-affixing device 41 affixes pull tabs 42 to the packaging material 11 so as to seal the punch holes from outside.

The packaging material 11 travels to a sterilizing tank 61 via a paper tensioner 43 and bending rollers r6 and r7. In the sterilizing tank 61, the packaging material 11 is sterilized by means of a sterilizing liquid, such as hydrogen peroxide. Reference numeral 62 denotes a bottom tray of the sterilizing tank 61.

Subsequently, the packaging material 11 travels to an air knife 45 via calendar rollers r8. The air knife 45 dries the packaging material 11. The dried packaging material 11 travels to upper forming rings 48 via a bending roller r9, a crease roller r10, and a bending roller r11. The packaging material 11 is gradually deformed into a tubular shape by means of the upper forming rings 48, movable forming rings 49, split forming rings 50, and a lower forming ring 51. In the course of the deformation, a longitudinal sealing device 55 longitudinally seals the packaging material 11, and a fluid food supplied through a filling pipe 52 is filled into the tubular packaging material 11.

The packaging material 11 filled with the fluid food travels to a pressure guide device 64, which is disposed downstream of the longitudinal sealing device 55 with respect to the conveyance direction of the packaging material 11. The pressure guide device 64 includes a pressure roller 65 (See FIGS. 2 and 4), which is disposed at the inside of a joining surface (seam) of a longitudinally sealed portion of the packaging material 11 being fed and serves as a first rotary member, and a counter roller 66, which is disposed in opposition to the pressure roller with the packaging material 11 pinched therebetween and serves as a second rotary member. As the packaging material 11 travels, the surface of the overlap of the longitudinally sealed region of the packaging material 11 and the affixal surface of the strip tape 34 are brought into closes contact with each other.

Subsequently, while being guided by tube support rollers r12, the packaging material 11 travels to a sealing-cutting section p1. In the sealing-cutting section p1, while pinching the packaging material 11, an unillustrated sealing-cutting device laterally seals and cuts the packaging material 11 at predetermined longitudinal intervals so as to form a pillow-like prototype container 23. The prototype container 23 is sent to a final forming-conveying apparatus 58. While being conveyed on the final forming-conveying apparatus 58, the prototype container 23 is formed into a predetermined shape, thereby completing the packaging container 33 which contains a fixed amount of fluid food.

Next, the pressure guide device 64 will be described in detail.

Figure 2:
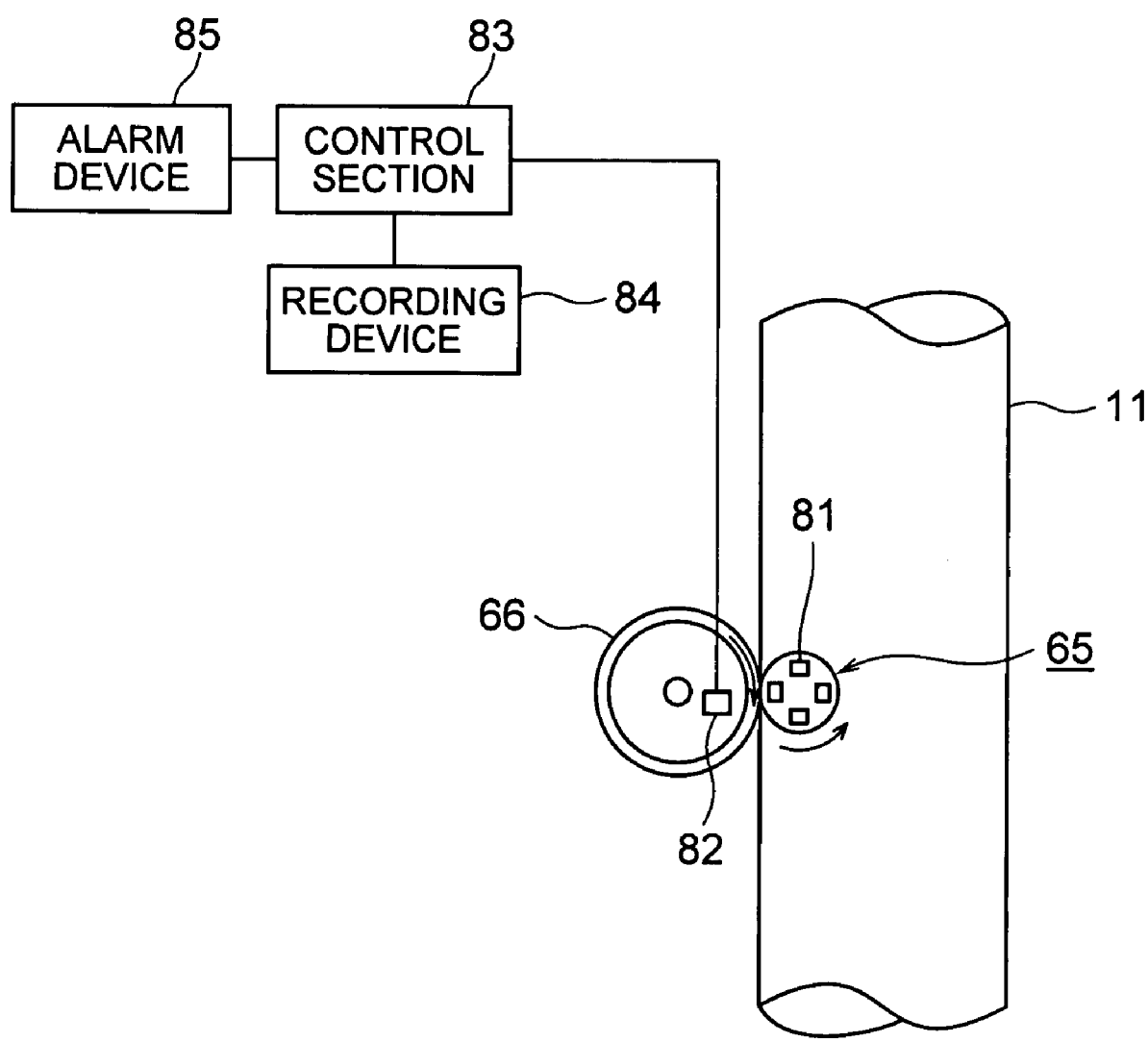
[FIG. 2] Conceptual view showing a method of monitoring a pressure guide device according to the embodiment of the present invention.
Figure 3:
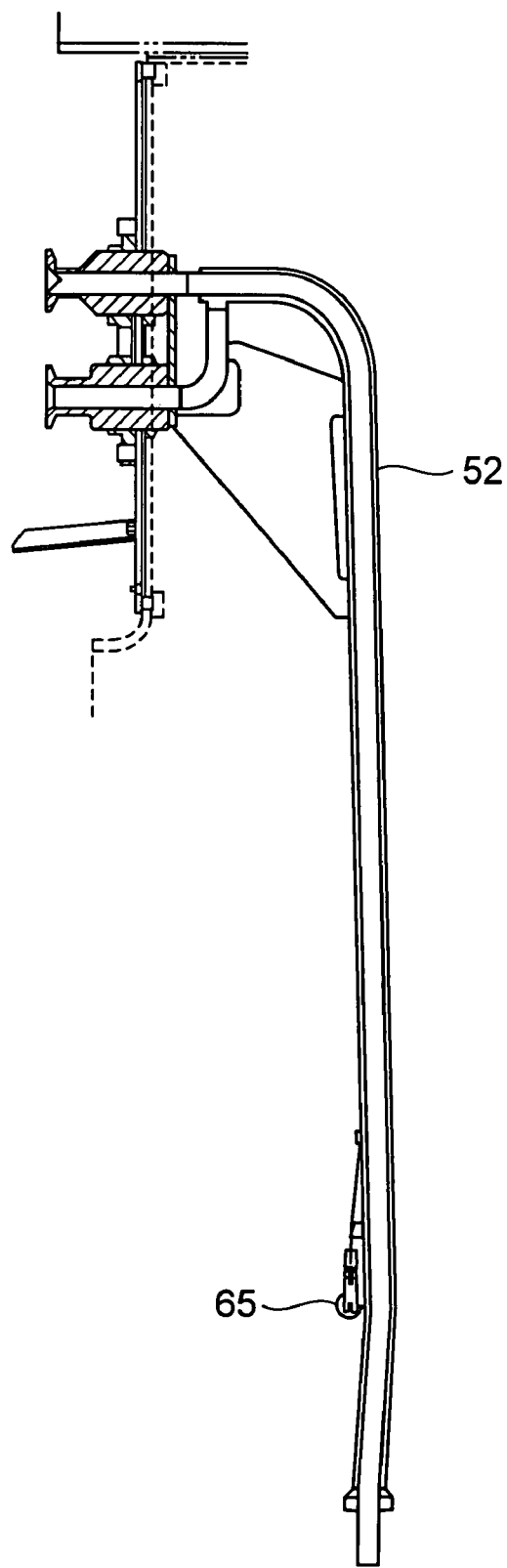
[FIG. 3] View showing a mounted condition of a pressure roller according to the embodiment of the present invention.
Figure 4:
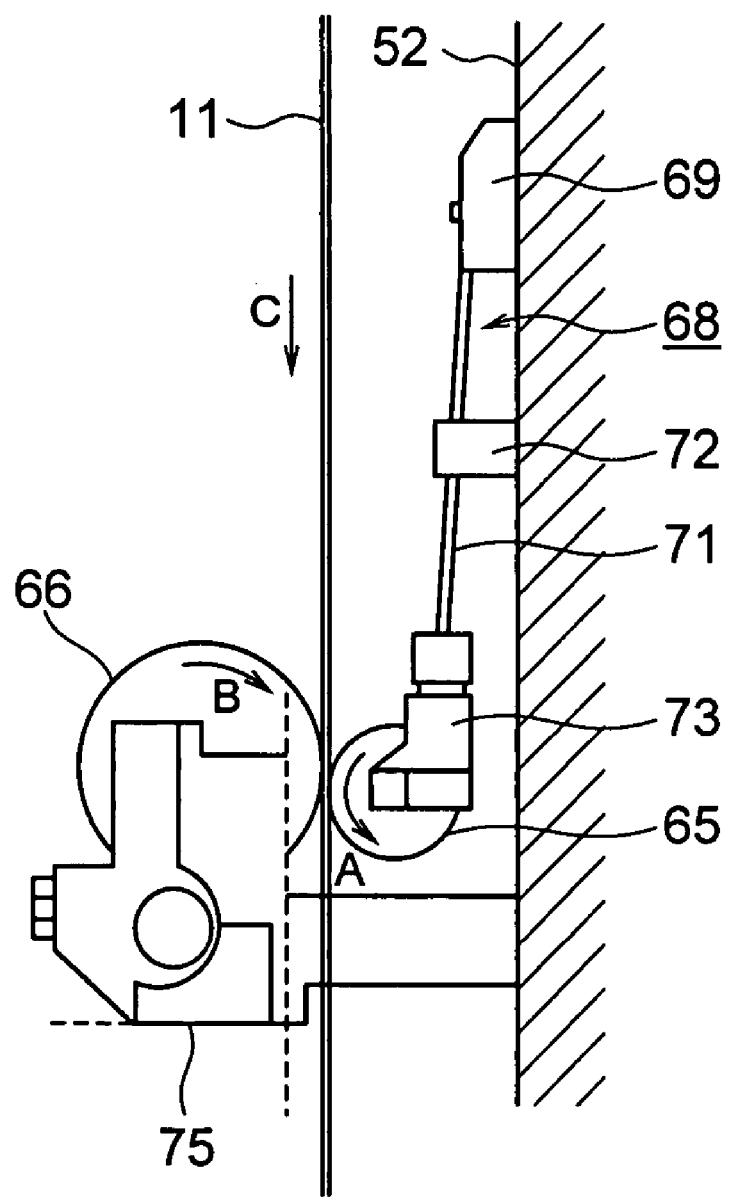
[FIG. 4] Schematic view of the pressure guide device according to the embodiment of the present invention.

FIG. 2 is a conceptual view showing a method of monitoring a pressure guide device according to the embodiment of the present invention; FIG. 3 is a view showing a mounted condition of a pressure roller according to the embodiment of the present invention; and FIG. 4 is a schematic view of the pressure guide device according to the embodiment of the present invention.

In the drawings, reference numeral 11 denotes the packaging material; reference numeral 52 denotes a filling pipe, which functions as a support member; and reference numeral 65 denotes a pressure roller, which serves as a first rotary member, is supported by a support mechanism 68 while being disposed at the inside of the joining surface of a longitudinally sealed portion of the packaging material 11 which has just been longitudinally sealed, and presses the longitudinally sealed region.

The support mechanism 68 includes a bracket 69, which is attached to the filling pipe 52 at a predetermined position; a tension rod 71, which serves as a force-applying member and is disposed in such a manner as to extend downward from the bracket 69; a support member 72, which supports the tension rod 71 and is attached to the filling pipe 52 at a position corresponding to an intermediate portion of the tension rod 71; and a rotation support member 73, which is attached to a tip end (a lower end in FIG. 4) of the tension rod 71 and supports the pressure roller 65 such that the pressure roller 65 is rotatable in the direction of arrow A. The tension rod 71 applies a predetermined force to the packaging material 11 so as to press the packaging material 11 radially outward.

Reference 66 denotes a counter roller, which serves as a second rotary member, is disposed in opposition to the pressure roller 65 with the packaging material 11 pinched therebetween, and receives a pressing force applied by the pressure roller 65. The counter roller 66 is supported on a frame of the filling machine by means of a support member 75, in such a manner as to be rotatable in the direction of arrow B.

Accordingly, as the packaging material 11 is fed in the direction of arrow C, the pressure roller 65 and the counter roller 66 are rotated with the packaging material 11 and the strip tape 34 (FIG. 1) pinched therebetween, thereby bringing the surface of an overlap of the longitudinally sealed region and the affixal surface of the strip tape 34 into close contact with each other.

Meanwhile, when the packaging material 11 is sealed by the longitudinal sealing device 55, the packaging material 11, the strip tape 34, etc. are heated, so that a resin, such as polyethylene resin, used to form the innermost layers of the packaging material 11, the strip tape 34, etc. may in some cases stick to the outer circumferential surface of the pressure roller 65. In this case, resistance is applied to the pressure roller 65 and reduces the rotational speed of the pressure roller 65.

If the condition is left without taking any measure thereagainst, there may arise damage to the inner surfaces of the packaging material 11 and the strip tape 34, or separation of a sticking resin piece and dropping of the resin piece into fluid food contained in the packaging material 11, potentially causing a deterioration in quality of the fluid food.

In order to cope with the problem, a plurality of permanent magnets 81 are circumferentially disposed in the pressure roller 65 to be located in the vicinity of the outer circumferential surface of the pressure roller 65, or to be exposed at the circumferential surface of the pressure roller 65, such that the N-pole and the S-pole are alternately oriented outward. The counter roller 66 assumes the form of a hollow body. A magnetic sensor 82, which serves as a detector and as a rotation detection signal generator, is disposed within the counter roller 66 at a predetermined position located in opposition to the packaging material 11 and in the vicinity of the pressure roller 65 and is fixed to the frame of the filling machine. The magnetic sensor 82 is formed of, for example, a Hall element. As the pressure roller 65 is rotated, the N-poles and the S-poles of the permanent magnets 81 alternately move to a position located in opposition to the magnetic sensor 82. Accordingly, the magnetic sensor 82 generates a rotation detection signal which varies periodically, and outputs the signal to a control section 83.

In the case where no resistance is applied to the pressure roller 65 and thus the pressure roller 65 is rotated normally, as the packaging material 11 is fed, the traveling speed of the packaging material 11 and the circumferential speed of the pressure roller 65 are equal to each other, so that a peak value appears in the rotation detection signal in a fixed cycle. By contrast, in the case where resistance is applied to the pressure roller 65 and thus the pressure roller 65 fails to be rotated normally, as the packaging material 11 is fed, the traveling speed of the packaging material 11 and the circumferential speed of the pressure roller 65 do not become equal to each other, and variations arise in a cycle of appearance of the peak value.

In order to cope with the above problem, an unillustrated monitoring processing means of the control section 83 performs monitoring processing; i.e., the monitoring processing means records, on a recording device 84 as a reference signal, a rotation detection signal detected when the pressure roller 65 is rotated normally; subsequently, reads a rotation detection signal at predetermined timing; and compares the read rotation detection signal with the reference signal to thereby judge whether the pressure roller 65 is rotated normally.

When the pressure roller 65 is not rotated normally, the monitoring processing means detects abnormality of rotation of the pressure roller 65, and an unillustrated report processing means of the control section 83 performs report processing; i.e., the report processing means generates an alarm signal and sends the signal to an alarm device 85 so as to report occurrence of the abnormality to an operator.

According to the present embodiment, the permanent magnets 81 are disposed in the pressure roller 65, and the magnetic sensor 82 generates a rotation detection signal in association with movement of the permanent magnets 81 effected by rotation of the pressure roller 65. However, the present invention is not limited thereto. For example, permanent magnets may be disposed in the counter roller 66 while a magnetic sensor is disposed at a predetermined position. In this case, the magnetic sensor generates a rotation detection signal in association with movement of the permanent magnets effected by rotation of the counter roller 66. Further alternatively, permanent magnets may be disposed in both the pressure roller 65 and the counter roller 66.

The present invention is not limited to the above-described embodiment. Numerous modifications and variations of the present invention are possible in light of the spirit of the present invention, and they are not excluded from the scope of the present invention.

INDUSTRIAL APPLICABILITY

The present invention can be applied to a packaging-container-manufacturing apparatus.

The invention claimed is:

1. A filling machine for filling a tubular packaging material, comprising:
   (a) a first rotary member rotatably disposed downstream of a longitudinal sealing device with respect to the conveyance direction of the tubular packaging material and disposed inside the tubular packaging material and in contact with a seam at a longitudinally sealed portion of the tubular packaging material being fed;
   (b) a second rotary member rotatably disposed in opposition to the first rotary member and in contact with an exterior surface of the seam of the packaging material pinched between the first and second rotary members;
   (c) a force applying member urging the first rotary member outward of the tubular packaging material and against the second rotary member, wherein the force-applying member is a torsion bar with one end fixed and extending from the fixed end to a distal free end on which the first rotary member is mounted, and further comprising a filling pipe extending within the tubular packaging material, and wherein the one end of the torsion bar is fixed to the filling pipe;
   (d) a rotation detection signal generator for generating a rotation detection signal in association with rotation of at least one of the first and second rotary members; and
   (e) monitoring processing means for reading, as a reference signal, the rotation detection signal detected when at least one of the first and second rotary members is rotated normally, such that a traveling speed of the tubular packaging material and a circumferential speed of the at least one of the first and second rotary members are substantially equal to each other; then reading a rotary detection signal at predetermined timing and comparing the read detection signal with the reference signal so as to detect abnormality of rotation of both of the first and second rotary members when both of the first and second rotary members are not rotated normally, such that the traveling speed of the tubular packaging material and a circumferential speed of both of the first and second rotary members are not substantially equal to each other.

2. A filling machine according to claim 1, wherein:
(a) the first rotary member is a pressure roller having a permanent magnet;
(b) the second rotary member is a counter roller; and
(c) the rotation detection signal generator generates a rotation detection signal in association with movement of the permanent magnet.

3. A filling machine according to claim 1, further comprising report processing means for reporting occurrence of abnormality to an operator when abnormality of rotation of the first rotary member is detected.

4. A filling machine according to claim 1 further comprising a support member fixed to the filling pipe and supporting the torsion bar at a point intermediate the one end and the distal end.

5. A filling machine according to claim 1 wherein the rotation detection signal generator is integral with and rotatable with the first rotary member.

6. A filling machine according to claim 1 wherein the rotation detection signal generator is integral with and rotatable with the first rotary member.

7. A filling machine according to claim 1 wherein the filling pipe extends coaxially within the tubular packaging material for filling the tubular packaging with a liquid food.

8. A filling machine according to claim 2 further comprising:
a magnetic sensor disposed within the second rotary member; and
wherein the plurality of permanent magnets are circumferentially disposed in the first rotary member, in the vicinity of the outer circumferential surface of the first rotary member, the permanent magnets having N-poles and S-poles alternately arranged radially outward of the first rotary member.

* * * * *